(12) United States Patent
Sun et al.

(10) Patent No.: US 9,613,270 B2
(45) Date of Patent: Apr. 4, 2017

(54) WEATHER DISPLAYING METHOD AND DEVICE

(71) Applicant: Xiaomi Inc., Beijing (CN)

(72) Inventors: Tongxuan Sun, Beijing (CN); Tian Ren, Beijing (CN); Jintao Chen, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 14/716,848

(22) Filed: May 19, 2015

(65) Prior Publication Data

US 2016/0048995 A1  Feb. 18, 2016

Related U.S. Application Data

(63) Continuation of application No. PCT/CN2015/071343, filed on Jan. 22, 2015.

(30) Foreign Application Priority Data

Aug. 12, 2014  (CN) .......................... 2014 1 0397287

(51) Int. Cl.
   *G06T 13/00* (2011.01)
   *G06K 9/00* (2006.01)
   *G01W 1/06* (2006.01)
   *G06T 13/60* (2011.01)

(52) U.S. Cl.
   CPC ........... *G06K 9/00476* (2013.01); *G01W 1/06* (2013.01); *G06T 13/60* (2013.01); *G06T 2210/56* (2013.01)

(58) Field of Classification Search
   None
   See application file for complete search history.

(56) References Cited

U.S. PATENT DOCUMENTS 8,707,352 B1   4/2014 Crespo et al.
2004/0239550 A1* 12/2004 Daly, Jr. ............... G01S 13/723
                                                                342/26 B (Continued)

FOREIGN PATENT DOCUMENTS

CN      101945173 A   1/2011
CN      101980134 A   2/2011

(Continued)

OTHER PUBLICATIONS

"International Search Report for PCT/CN2015/071343".
Extended European search report for 15176158.2.

*Primary Examiner* — Martin Mushambo
(74) *Attorney, Agent, or Firm* — Jun He Law Offices P.C.; James J. Zhu

(57) ABSTRACT

The present disclosure discloses a method and a device for displaying weather. The method includes: acquiring weather information and orientation information of a terminal device; generating a weather animation according to the weather information and the orientation information of the terminal device; and displaying the weather animation on the terminal device. Accordingly, a plurality of weather conditions are comprehensively and dynamically presented via integrated motion pictures, and the weather conditions are displayed more accurately, realistically, and intuitively.

18 Claims, 9 Drawing Sheets

(56) References Cited

U.S. PATENT DOCUMENTS

| | | | | |
|---|---|---|---|---|
| 2006/0092179 A1* | 5/2006 | Sumizawa | ......... | G01C 21/3676 345/629 |
| 2006/0229810 A1 | 10/2006 | Cross et al. | | |
| 2011/0057878 A1* | 3/2011 | Moore | ................. | G06F 3/0304 345/157 |
| 2012/0069052 A1 | 3/2012 | Lee et al. | | |

FOREIGN PATENT DOCUMENTS

| | | |
|---|---|---|
| CN | 102164209 A | 8/2011 |
| CN | 103376988 A | 10/2013 |
| CN | 103389855 A | 11/2013 |
| CN | 103500049 A | 1/2014 |
| CN | 103514626 A | 1/2014 |
| CN | 103970258 A | 8/2014 |
| CN | 104183004 A | 12/2014 |
| EP | 2631779 A1 | 8/2013 |
| KR | 1020100026258 A | 3/2010 |
| KR | 101235850 B1 | 2/2013 |
| KR | 10-2013-0100611 A | 9/2013 |
| KR | 10-2014-0035713 A | 3/2014 |
| RU | 44185 U1 | 2/2005 |
| RU | 2297040 C2 | 4/2007 |
| RU | 2477879 C2 | 3/2013 |

* cited by examiner

WEATHER DISPLAYING METHOD AND DEVICE

CROSS-REFERENCE TO RELATED APPLICATIONS

This application is a Continuation Application of International Application No. PCT/CN2015/071343 with an international filing date of Jan. 22, 2015, which is based upon and claims priority to Chinese Patent Application No. 201410397287.6, filed on Aug. 12, 2014, the entire contents of which are incorporated herein by reference.

TECHNICAL FIELD

The present disclosure relates to the field of information processing technologies, and more particularly, to a method and a device for displaying weather.

BACKGROUND

In recent years, with the development of smart phones, mobile phone application have become an indispensable product in people's daily life. Gathering of weather information, which is necessary for people in thousands of years, occupies an important place in the mobile phone applications.

Weather applications have undergo a significant development, and a large variety of weather applications are available in the market. In related technologies, a weather application describes weather conditions. Generally, some images or animations are preconfigured in the application, and these images or animations are placed on the interface of the application depending on the types of weather.

SUMMARY

Embodiments of the present disclosure provide a method and a device for displaying weather.

According to a first aspect of the embodiments of the present disclosure, a method for displaying weather is provided. The method includes: acquiring weather information and orientation information of a terminal device; generating a weather animation according to the weather information and the orientation information of the terminal device; and displaying the weather animation on the terminal device.

According to a second aspect of the embodiments of the present disclosure, a device for displaying weather is provided. The device includes: one or more processor; a memory for storing instructions executable by the processors. In this case, the processors are configured to acquire weather information and orientation information of a terminal device and generate a weather animation according to the weather information and the orientation information of the terminal device and display the weather animation on the terminal device.

According to a third aspect of embodiments of the present disclosure, a non-transitory computer-readable storage medium is provided. The non-transitory computer-readable storage medium have stored therein instructions that, when executed by one or more processors of a device, cause the device to perform: acquiring weather information and orientation information of a terminal device; generating a weather animation according to the weather information and the orientation information of the terminal device; and displaying the weather animation on the terminal device.

In the embodiments, the weather animation is generated according to the weather information and the orientation information. In this way, a plurality of weather conditions are comprehensively and dynamically presented via integrated motion pictures, and the weather conditions are displayed more accurately, realistically, and intuitively. In addition, the weather conditions are presented in combination with current orientation information of a terminal device, thus making the presentation of the weather condition effectively interacts with users by considering the state which the users brought upon the terminal device, and creating more diverse effects in the presentation of the weather conditions. This gives a fully immersive experience for the user, and improves user experience.

It shall be appreciated that the above general description and the detailed description hereinafter are only illustrative and interpretative, but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the specification, serve to explain the principles of the present disclosure.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
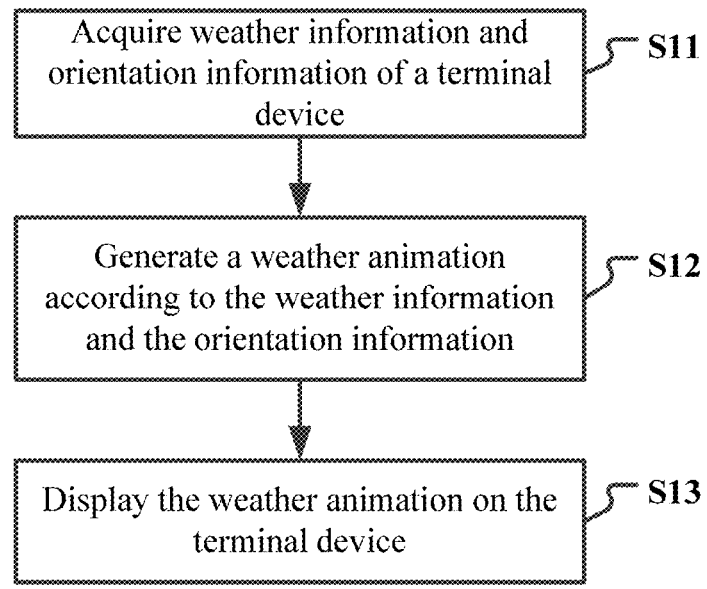
FIG. 1 is a flowchart illustrating a method for displaying weather according to an exemplary embodiment of the present disclosure.

FIG. 1 is a flowchart illustrating a method for displaying weather according to an exemplary embodiment of the present disclosure. As illustrated in FIG. 1, the method for displaying weather is applicable to a terminal device, and includes the following steps.

In step S11, weather information and orientation information of a terminal device are acquired.

In step S12, a weather animation is generated according to the weather information and the orientation information.

In step S13, the weather animation is displayed on the terminal device.

In the above step S11, the terminal device may acquire weather information covering a plurality of weather conditions over the Internet, for example, such weather-related information as sun, cloud, overcast, rain (at different grades), freezing rain, shower, snow (at different grades), sleet, hail, foggy, flying sand, flying dust, haze (at different grades), wind (wind direction and wind force), temperature, humidity, and the like.

In the above step S11, the current orientation information of the terminal device, i.e., information indicating whether the terminal device is laid horizontally, vertically, or sideways, and what is the specific inclination angle, and the like may be detected by a gravity sensor equipped in the terminal device, for example, an accelerometer, a gyroscope, an electronic compass, and the like. Further, it may also be detected whether a screen of the terminal device is faced horizontally upward or horizontally downward. When the terminal device is held in different orientations, different weather animations are presented for the user; and when the user changes the orientation of the terminal device, an animation corresponding to the current orientation of the terminal device is accordingly displayed on the screen of the terminal device.

In this embodiment, the weather animation is generated according to the weather information and the orientation information. In this way, a plurality of weather conditions are comprehensively and dynamically presented via integrated motion pictures, and the weather conditions are displayed more accurately, realistically, and intuitively. In addition, the weather conditions are presented in combination with current orientation information of a terminal device, thus making the presentation of the weather condition effectively interacts with users by considering the state which the users brought upon the terminal device, and creating more diverse effects in the presentation of the weather conditions. This gives a fully immersive experience for the user, and improves user experience.

Figure 2:
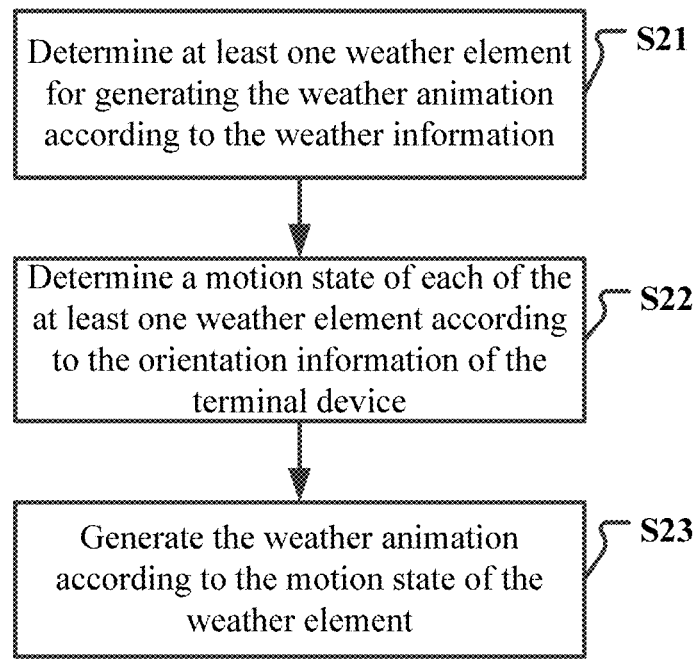
FIG. 2 is a flowchart illustrating a method for displaying weather according to another exemplary embodiment of the present disclosure.

FIG. 2 is a flowchart illustrating a method for displaying weather according to another exemplary embodiment of the present disclosure. As illustrated in FIG. 2, optionally, the above step S12 includes the following steps.

In step S21, at least one weather element for generating the weather animation is determined according to the weather information.

In step S22, a motion state of each of the at least one weather element is determined according to the orientation information of the terminal device.

In step S23, the weather animation is generated according to the motion state of the weather element.

The weather element in the weather animation refers to an element for generating the displaying of the weather animation. For example, with respect to a weather animation showing rain, the weather element is rain drops; with respect to a weather animation showing snow, the weather element is snow flakes; with respect to a weather animation showing flying sand, the weather element is sand; with respect to a weather animation showing sunny day, the weather element may include the sun, the moon, or the cloud; and so on.

In an optional technical solution, a motion state of a weather element in a weather animation is determined, which make the displaying of the weather conditions is more accurately, realistically, and intuitively. This gives a fully immersive experience for the user, and improves user experience.

Optionally, the weather information includes weather type and weather grade. And parameters of the weather element include type of the weather element, number of objects of each weather element, and size of each object.

The above Step S21 includes determining the type of the weather element, the number of objects of each weather element, and the size of each object according to the weather type and the weather grade.

For example, when the weather type is rainy and the weather grade is heavy rain, it is determined that the type of the weather element in the weather animation is rain drops, and the number of rain drops in the weather animation is 300. The size of each rain drop can be set to be the same or different.

In an optional technical solution, a weather element in a weather animation is more delicately presented according to the weather type and the weather grade. This improves reality and intuition in displaying the weather condition.

Optionally, the motion state includes an initial position and a motion trajectory.

The above Step S22 includes determining an initial position and a motion trajectory of each object of the weather element according to the orientation information of the terminal device. And the above step S23 includes displaying each object of the weather element as moving from the initial position along the motion trajectory on the terminal device.

For example, with respect to the rain drops, when the terminal device is laid vertically, it is determined that the initial position of the rain drops is the upper end of the weather animation; and when the terminal is laid horizontally, the initial position of the rain drops may be randomly laid on the entire region of the weather animation. In the weather animation, it may be set that each rain drop has a different initial position, thus making the weather animation more realistic.

In an optional technical solution, an initial position and a motion trajectory of each weather element in a weather animation are determined according to the orientation information of the terminal device, such that a weather element in a weather animation is more delicately presented. This improves reality and intuition in displaying the weather condition.

Optionally, determining an initial position and a motion trajectory of each object of the weather element according to the orientation information of the terminal device includes determining that the motion trajectory of each object of the weather element is displayed as moving from the initial position along the gravitation direction according to the orientation information of the terminal device.

For example, with respect to the motion trajectory of the rain drops, regardless of in which orientation the terminal device is held, the rain drops always fall along the gravitation direction.

In an optional technical solution, a weather element is set as falling along the gravitation direction, such that a weather element in a weather animation is more delicately presented. This improves reality in displaying the weather condition.

Optionally, the orientation information of the terminal device includes, but not limited to: horizontal, vertical, and inclined. In this case, "horizontal", "vertical" and "inclined" indicate the positional relationship between a plane where the screen of the terminal device is located and the ground plane. When the terminal device is inclined, such information as a direction and an angle of the inclination may be further acquired. Determining, according to the orientation information of the terminal device, that the motion trajectory of each object of the weather element is displayed as moving from the initial position along the gravitation direction includes: determining that the motion trajectory of each object of the weather element is displayed as moving along a direction vertical to a plane where the screen of the terminal device is located when the terminal device is laid horizontally; determining that the motion trajectory of each object of the weather element is displayed as moving from top to bottom on a plane where the screen of the terminal device is located when the terminal device is laid vertically; determining that the motion trajectory of each object of the weather element is displayed as moving from top to bottom along an upright direction in a plane where the screen of the terminal device is located when the terminal device is laid sideways.

Figure 3:
FIG. 3 and FIG. 4 are schematic diagrams illustrating displaying of a weather animation according to an exemplary embodiment of the present disclosure.
Figure 4:

FIG. 3 and FIG. 4 are schematic diagrams illustrating displaying of a weather animation according to an exemplary embodiment of the present disclosure.

For example, using the falling trajectory of the rain drops as an example, as illustrated in FIG. 3, when the terminal device is laid vertically, the rain drops may be displayed as falling from top to bottom on a plane where the screen of the terminal device is located. As illustrated in FIG. 4, when the terminal device is laid sideways, the rain drops may be displayed as falling from top to bottom along an upright direction in a plane where the screen of the terminal device is located. When the terminal device is laid horizontally, the rain drops may be displayed as falling along a direction vertical to a plane where the screen of the terminal device is located.

Optionally, the orientation information of the terminal device further includes the screen of the terminal device is faced horizontally upward and horizontally downward. Determining, according to the orientation information of the terminal device, that the motion trajectory of each object of the weather element is displayed as moving from the initial position along a gravitation direction includes: determining that the motion trajectory of each object of the weather element is displayed as falling down from outside of the screen to inside of the screen along a direction vertical to a plane where the screen is located when the screen is horizontally upward; or determining that the motion trajectory of each object of the weather element is displayed as falling down from inside of the screen to outside of the screen along a direction vertical to a plane where the screen is located when the screen is horizontally downward, FIG. 5 and FIG. 6 are schematic diagrams illustrating displaying of a weather animation according to another exemplary embodiment of the present disclosure.

Figure 5:
FIG. 5 and FIG. 6 are schematic diagrams illustrating displaying of a weather animation according to another exemplary embodiment of the present disclosure.
Figure 6:

For example, using the falling trajectory of the rain drops as an example, as illustrated in FIG. 5, when the screen of the terminal device is faced horizontally upward, the rain drops are displayed as falling from outside of the screen to inside of the screen. As illustrated in FIG. 6, when the screen of the terminal device is faced horizontally downward, the rain drops are displayed as falling from inside of the screen to outside of the screen.

In an optional technical solution, a weather animation is generated according to the orientation of the terminal device, such that the generated weather animation is more realistic. This gives a fully immersive experience for the user, and improves user experience.

Optionally, the weather information further includes: wind force information and wind direction information. Determining an initial position and a motion trajectory of each object of the weather element according to the orientation information of the terminal device includes calculating a position of each object of the weather element in each frame of animation according to the type of the weather element, the size of each object, the wind force information, the wind direction information, and the orientation information of the terminal device.

For example, with respect to determining of a motion trajectory of the rain drops, weather information and orientation information of the terminal device need to be collaboratively considered. For example, when it is windy, the rain drops may not fall vertically, but fall sideways at a specific angle. An inclination angle of falling of the rain drops is calculated according to such information as wind force and wind direction. When the wind direction is East and the wind force is Grade 3, it may be set that the rain drops fall at a smaller angle towards the right side of the screen.

In an optional technical solution, a weather animation is generated according to information of a plurality of weather conditions. In this way, a plurality of weather conditions are comprehensively and dynamically presented via integrated motion pictures, and the weather conditions are displayed more accurately, more realistically, and more intuitively.

Optionally, the above step S12 includes using an image captured by the camera of the terminal device as a background of the weather animation, or using a predetermined image as a background of the weather animation.

For example, as illustrated in FIG. 3 and FIG. 4, a predetermined image is used as the background of the weather animation; or, as illustrated in FIG. 5 and FIG. 6, a camera at the rear side of the terminal device is opened, and an image captured by the camera is used as the background of the weather animation. Herein, if the user looks down at the screen, the user may find that the rain drops seemingly fall from the screen down to the ground; if the user looks up at the screen, the user may find that the rain drops seemingly fall from the sky.

In an optional technical solution, the background of a weather animation may be a constant, predetermined image or a real scene image, and the weather conditions are displayed more diversified, more realistically, and more intuitively. This gives a fully immersive experience for the user, and improves user experience.

Figure 7:
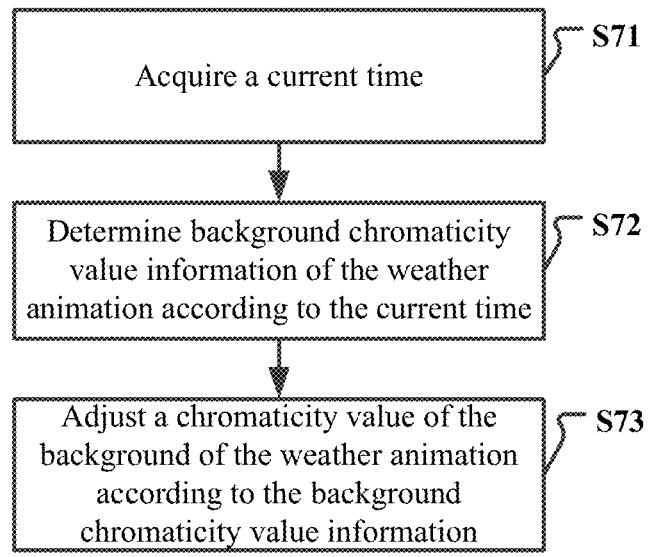
FIG. 7 is a flowchart illustrating a method for displaying weather according to another exemplary embodiment of the present disclosure.

FIG. 7 is a flowchart illustrating a method for displaying weather according to another exemplary embodiment of the present disclosure. As illustrated in FIG. 7, optionally, when a predetermined image is used as the background of the weather animation, the method further includes the following steps.

In step S71, current time is acquired.

In step S72, background chromaticity value information of the weather animation is determined according to the current time.

In step S73, a chromaticity value of the background of the weather animation is adjusted according to the background chromaticity value information.

In an optional technical solution, the background using the predetermined image varies with the time, such that the background of a weather animation is subjected to variations of luminosity and chromaticity, and variations of light with the time are practically presented, thereby giving a fully immersive experience for the user. In addition, it is unnecessary to change the background image, and only a chromaticity value thereof needs to be modified. This reduces stored image resources, and improves processing efficiency.

Figure 8:
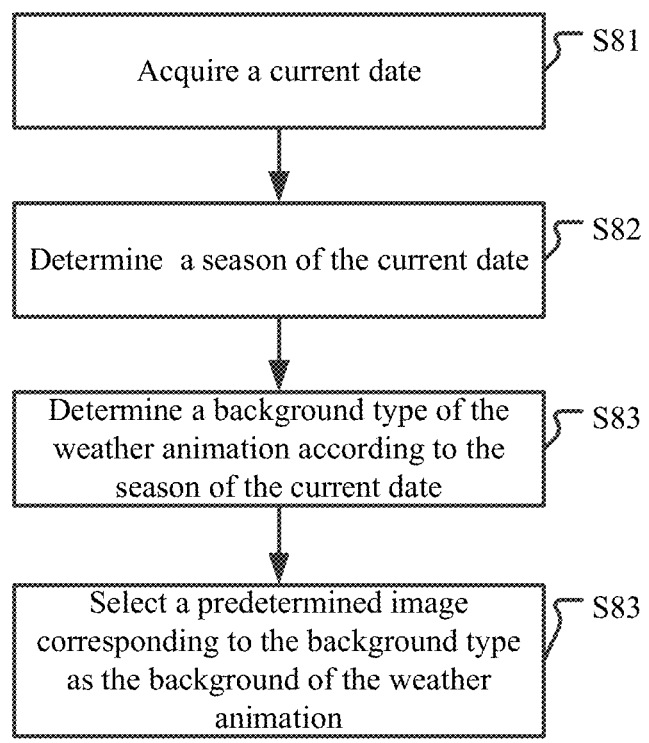
FIG. 8 is a flowchart illustrating a method for displaying weather according to another exemplary embodiment of the present disclosure.

FIG. 8 is a flowchart illustrating a method for displaying weather according to another exemplary embodiment of the present disclosure. As illustrated in FIG. 8, optionally, when a predetermined image is used as the background of the weather animation, the method further includes the following steps.

In step S81, a current date is acquired.

In step S82, a season of the current date is determined.

In step S83, a background type of the weather animation is determined according to the season of the current date.

In step S84, a predetermined image corresponding to the background type is selected as the background of the weather animation.

In an optional technical solution, with respect to a background with a predetermined image, a corresponding background image may be selected to display a weather animation according to the current season. For example, four-season (spring, summer, autumn, and winter) modes may be set, wherein in each mode, different images are assigned to correspond to different months; and a corresponding image may be selected as the background of the weather animation according to a current date. The season factor is considered in displaying a weather animation, such that a fully immersive experience is given to the user, and user experience is improved.

Optionally, a current ambient temperature and/or a current ambient humidity may be further acquired, and the display effect of the weather animation may be adjusted according to the current ambient temperature and/or the current ambient humidity.

In this embodiment, with respect to such weather conditions as rain, snow, hail, sand and dust, and the like, a weather animation may be generated in collaborative consideration of a plurality of weather information, for example, rain, snow, hail, sand and dust volume, wind force, wind direction, current time, season, temperature and the like, and orientation of the terminal device, and direction of the screen facing. When lightning is present, an animation of lightning may be added. For example, an effect of lightning may be achieved by suddenly lighting a specific region in the animation.

With respect to a sunny weather condition, a sunlight irradiation direction and color thereof, or a moon shape and color thereof, or the like may be set according to current time, season, temperature, and the like.

With respect to a cloudy weather condition, a cloud drifting effect may be displayed in the animation according to current wind force and wind direction.

With respect to a foggy or hazy weather condition, visibility of the background may be adjusted, and a severity grade of the fog or haze may be displayed.

In this embodiment, a weather animation may be generated by using the Draw function in the Android system. For example, rain drops may be continuously drawn to generate an animation about the rain. If a 3D effect needs to be simulated, the OpenGL technology may be used to generate a 3D weather animation.

According to the method for displaying weather provided in the present disclosure, the animation effect generated is more accurate and realistic. This gives a fully immersive experience for the user, and improves user experience.

Figure 9:
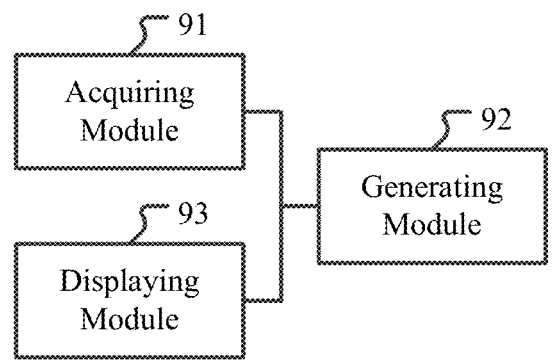
FIG. 9 is a block diagram illustrating a weather displaying apparatus according to an exemplary embodiment of the present disclosure.

FIG. 9 is a block diagram illustrating a weather displaying apparatus according to an exemplary embodiment of the present disclosure. As illustrated in FIG. 9, the apparatus includes: an acquiring module 91, a generating module 92, and a displaying module 93.

The acquiring module 91 is configured to acquire weather information and orientation information of a terminal device.

The generating module 92 is configured to generate a weather animation according to the weather information and the orientation information of the terminal device.

The displaying module 93 is configured to display the weather animation on the terminal device.

Figure 10:
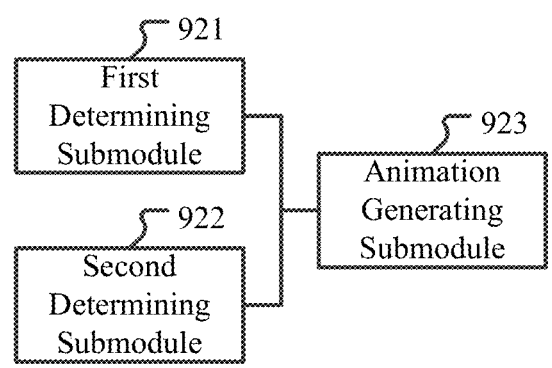
FIG. 10 is a block diagram illustrating a generating module according to an exemplary embodiment of the present disclosure.

FIG. 10 is a block diagram illustrating a generating module according to an exemplary embodiment of the present disclosure. As illustrated in FIG. 10, optionally, the generating module 92 includes: a first determining submodule 921, a second determining submodule 922, and an animation generating submodule 923.

The first determining submodule 921 is configured to determine at least one weather element for generating the weather animation according to the weather information.

The second determining submodule 922 is configured to determine a motion state of each of the at least one weather element according to the orientation information of the terminal device.

The animation generating submodule 923 is configured to generate the weather animation according to the motion state of the weather element.

Optionally, the weather information acquired by the acquiring module 91 includes: weather type and weather grade. And parameters of the weather element determined by the first determining submodule 921 include type of the weather element, number of objects of each weather element, and size of each object. The first determining submodule 921 is configured to determine the type of the weather element, the number of objects of each weather element, and the size of each object according to the weather type and the weather grade.

Optionally, the motion state determined by the second determining submodule 922 includes an initial position and a motion trajectory; the second determining submodule 922 is configured to determine an initial position and a motion trajectory of each object of the weather element according to the orientation information of the terminal device. And the displaying module 93 is configured to display each object of the weather element as moving from the initial position along the motion trajectory on the terminal device.

Optionally, the second determining submodule 922 is configured to determine, according to the orientation information of the terminal device, that each object of the weather element moves from the initial position along the gravitation direction.

Optionally, the orientation information of the terminal device acquired by the acquiring module 91 includes: horizontal, vertical, and inclined. The second determining submodule 922 is configured to: when the terminal device is laid horizontally, determine that the motion trajectory of each object of the weather element is displayed as moving along a direction vertical to a plane where the screen of the terminal device is located; when the terminal device is laid vertically, determine that the motion trajectory of each object of the weather element is displayed as moving from top to bottom on a plane where the screen of the terminal device is located; or when the terminal device is laid sideways, determine that the motion trajectory of each object of the weather element is displayed as moving from top to bottom along an upright direction in a plane where the screen of the terminal device is located.

Optionally, the orientation information of the terminal device acquired by the acquiring module 91 further includes that the screen of the terminal device is faced horizontally upward and horizontally downward. The second determining submodule 922 is configured to: when the screen is faced horizontally upward, determine that the motion trajectory of each object of the weather element is displayed as falling down from outside of the screen to inside of the screen along a direction vertical to a plane where the screen is located; or when the screen is faced horizontally downward, determine that the motion trajectory of each object of the weather element is displayed as falling down from inside of the screen to outside of the screen along a direction vertical to a plane where the screen is located.

Optionally, the weather information acquired by the acquiring module 91 further includes wind force information and wind direction information. And the second determining submodule 922 is configured to calculate a position of each object of the weather element in each frame of animation according to the type of the weather element, the size of each object, the wind force information, the wind direction information, and the orientation information of the terminal device.

Figure 11:
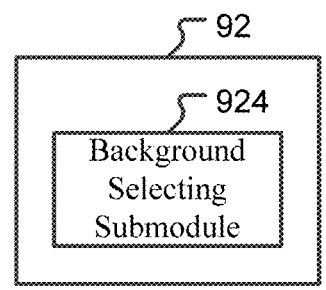
FIG. 11 is a block diagram illustrating a generating module according to another exemplary embodiment of the present disclosure.

FIG. 11 is a block diagram illustrating a generating module according to another exemplary embodiment of the present disclosure. As illustrated in FIG. 11, optionally, the generating module 92 includes a background selecting submodule 924.

The background selecting submodule 924 is configured to use a image captured by a camera of the terminal device as a background of the weather animation, or use a predetermined image as a background of the weather animation.

Figure 12:
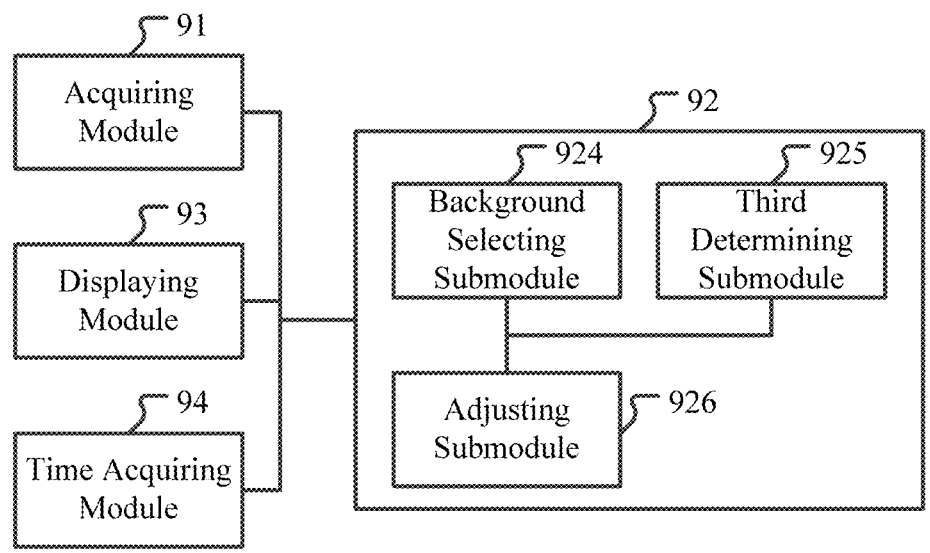
FIG. 12 is a block diagram illustrating a weather displaying apparatus according to another exemplary embodiment of the present disclosure.

FIG. 12 is a block diagram illustrating a weather displaying apparatus according to another exemplary embodiment of the present disclosure. As illustrated in FIG. 12, optionally, the apparatus further includes a time acquiring module 94.

The time acquiring module 94 is configured to acquire current time when the predetermined image is used as the background of the weather animation.

The generating module 92 further includes a third determining submodule 925 and an adjusting submodule 926.

The third determining submodule 925 is configured to determine background chromaticity value information of the weather animation according to the current time.

The adjusting submodule 926 is configured to adjust a chromaticity value of the background of the weather animation according to the background chromaticity value information.

Figure 13:
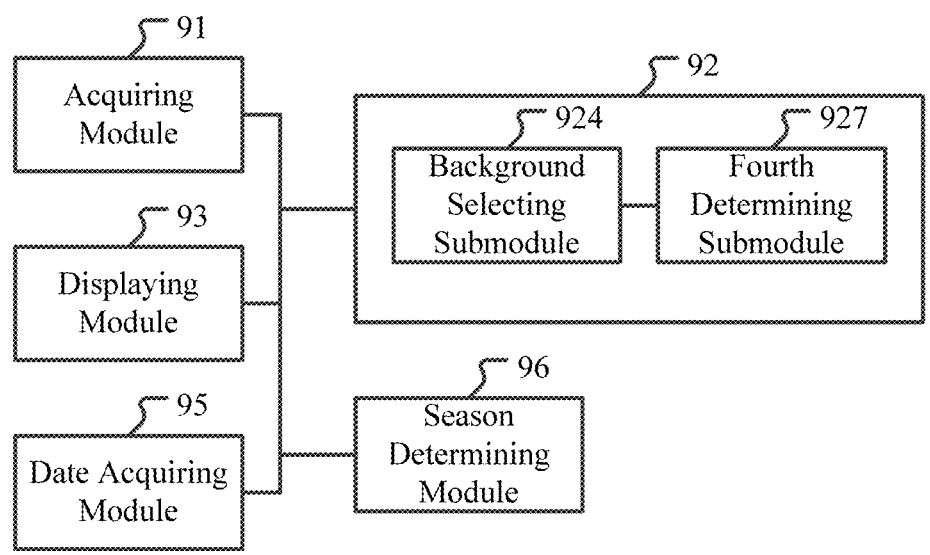
FIG. 13 is a block diagram illustrating a weather displaying apparatus according to another exemplary embodiment of the present disclosure.

FIG. 13 is a block diagram illustrating a weather displaying apparatus according to another exemplary embodiment of the present disclosure. As illustrated in FIG. 13, optionally, the apparatus further includes a date acquiring module 95 and a season determining module 96.

The date acquiring module 95 is configured to acquire a current date when the predetermined image is used as the background of the weather animation.

The season determining module 96 is configured to determine a season of the current date.

The generating module 92 further includes a fourth determining submodule 927.

The fourth determining submodule 927 is configured to determine a background type of the weather animation according to the season of the current date.

The background selecting submodule 924 is configured to select a predetermined image corresponding to the background type as the background of the weather animation.

With respect to the apparatuses in the above embodiments, the specific implementations of operations executed by various modules thereof have been described in detail in the embodiments illustrating the methods, which are not described herein any further.

In this embodiment, a weather animation is generated according to weather information and orientation information. In this way, a plurality of weather conditions are comprehensively and dynamically presented via integrated motion pictures, and the weather conditions are displayed more accurately, more realistically, and more intuitively. In addition, the weather conditions are presented in combination with current orientation information of a terminal device, thus making the presentation of the weather conditions effectively interacts with users by considering the state which the users brought upon the terminal device, and creating more diverse effects in the presentation of the weather conditions. This gives a fully immersive experience for the user, and improves user experience.

The present disclosure further provides a device for use in weather display which includes a processor and a memory for storing instructions executable by the processor which is configured to acquire weather information and orientation information of a terminal device and generate a weather animation according to the weather information the orientation information of the terminal device, and then display the weather animation on the terminal device.

In this embodiment, a weather animation is generated according to weather information and orientation information. In this way, a plurality of weather conditions are comprehensively and dynamically presented via integrated motion pictures, and the weather conditions are displayed more accurately, more realistically, and more intuitively. In addition, the weather conditions are presented in combination with current orientation information of a terminal device, thus making the presentation of the weather conditions effectively interacts with users by considering the state which the users brought upon the terminal device, and creating more diverse effects in the presentation of the weather conditions. This gives a fully immersive experience for the user, and improves user experience.

Figure 14:
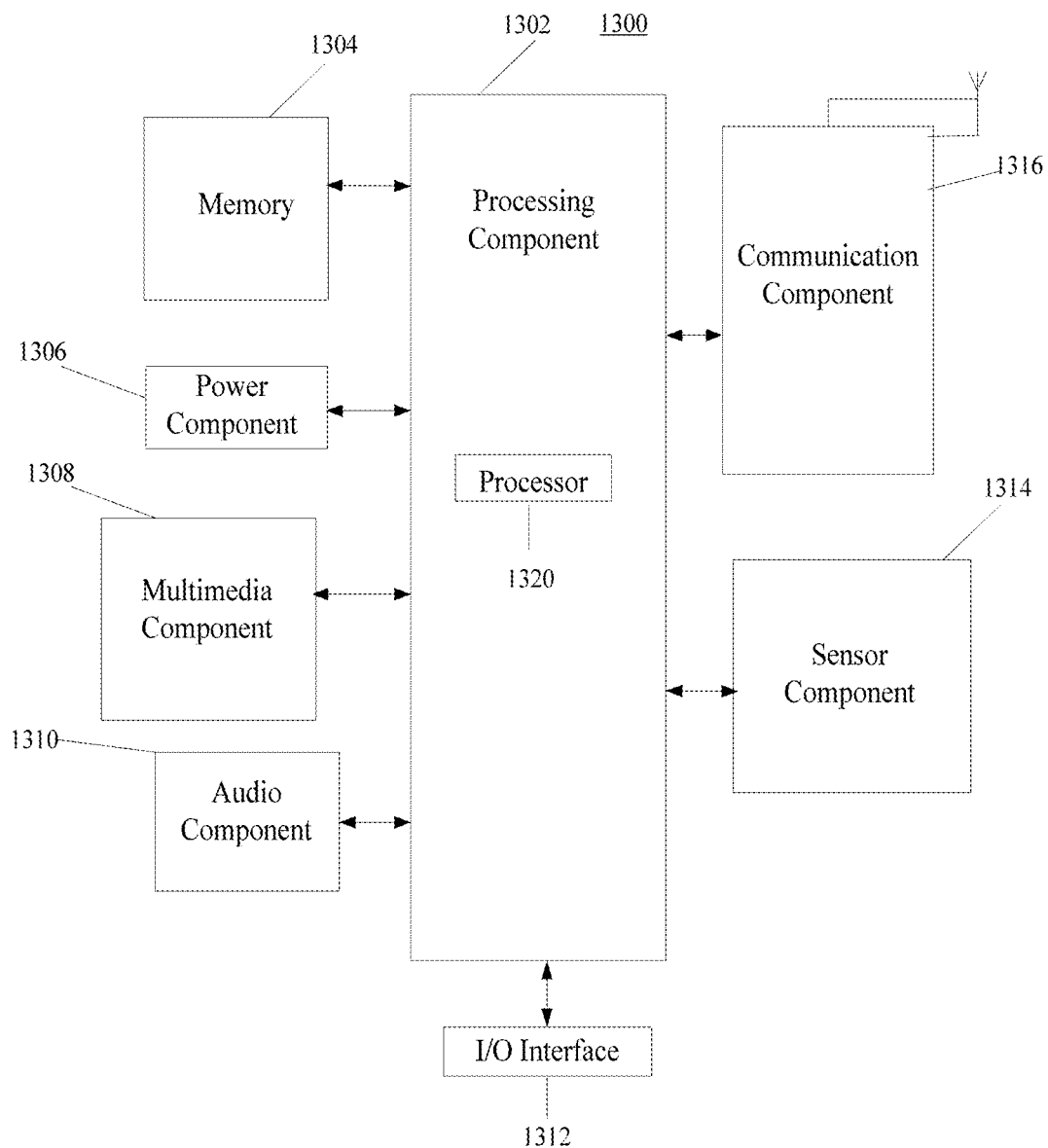
FIG. 14 is a block diagram illustrating a device 1300 for displaying weather according to an exemplary embodiment of the present disclosure.

FIG. 14 is a block diagram illustrating a device 1300 for use in weather displaying according to an exemplary embodiment of the present disclosure. The device 1300 may be a terminal device, such as a mobile phone, a computer, a digital broadcast terminal, a messaging device, a gaming console, a tablet, a medical device, an exercise equipment, a personal digital assistant, and the like.

Referring to FIG. 14, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or a part of the steps in the above-described methods. In addition, the processing component 1302 may include one or more modules which facilitate the interaction between the processing component 1302 and other components. For example, the processing component 1302 may include a multimedia module to facilitate the interaction between the multimedia component 1308 and the processing component 1302.

The memory 1304 is configured to store various types of data to support the operations of the device 1300. Examples of such data include instructions for any application or method operated on the device 1300, contact data, phonebook data, messages, images, videos, and the like. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power supplies, and other components associated with the generation, management, and distribution of power in the device 1300.

The multimedia component 1308 includes a screen providing an output interface between the device 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and/or the rear camera may receive external multimedia data while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone (MIC) configured to receive an external audio signal when the device 1300 is in an operation mode, such as a call mode, a recording mode, or a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and a peripheral interface module, such as a keyboard, a click wheel, a button, or the like. The buttons may include, but are not limited to, a home button, a volume button, a starting button, and a locking button.

The sensor component 1314 includes one or more sensors to provide status assessments of various aspects of the device 1300. For example, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communications, wired or wirelessly, between the device 1300 and other devices. The device 1300 may access a wireless network based on a communication standard, such as WiFi, 2G, or 3G, or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, for example, the memory 1304 including instructions, executable by the processor 1320 in the device 1300, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

A non-transitory computer-readable storage medium is provided. When instructions stored in the storage medium are executed by a processor of a mobile terminal, the mobile terminal is caused to perform a method for displaying weather. In this case, the method includes: acquiring weather information and orientation information of the terminal device; generating a weather animation according to the weather information and the orientation information of the terminal device; and displaying the weather animation on the terminal device.

Optionally, generating a weather animation according to the weather information and the orientation information of the terminal device includes: determining at least one weather element for generating the weather animation according to the weather information; determining a motion state of each of the at least one weather element according to the orientation information of the terminal device; and generating the weather animation according to the motion state of the weather element.

Optionally, the weather information includes weather type and weather grade. And parameters of the weather element include type of the weather element, number of objects of each weather element, and size of each object. Determining at least one weather element for generating the weather animation according to the weather information includes determining the type of the weather element, the number of objects of each weather element and the size of each object according to the weather type and the weather grade.

Optionally, the motion state includes an initial position and a motion trajectory. Determining a motion state of each of the at least one weather element according to the orientation information of the terminal device includes determining an initial position and a motion trajectory of each object of the weather element according to the orientation information of the terminal device. And displaying the weather animation on the terminal device includes displaying each object of the weather element as moving from the initial position along the motion trajectory on the terminal device.

Optionally, determining an initial position and a motion trajectory of each object of the weather element according to the orientation information of the terminal device includes determining, according to the orientation information of the terminal device, that the motion trajectory of each object of the weather element is displayed as moving from the initial position along the gravitation direction.

Optionally, the orientation information of the terminal device includes horizontal, vertical, and inclined. And determining, according to the orientation information of the terminal device, that the motion trajectory of each object of the weather element is displayed as moving from the initial position along the gravitation direction includes: determining that the motion trajectory of each object of the weather element is displayed as moving along a direction vertical to a plane where the screen of the terminal device is located when the terminal device is laid horizontally; determining that the motion trajectory of each object of the weather element is displayed as moving from top to bottom on a plane where the screen of the terminal device is located when the terminal device is laid vertically; determining that the motion trajectory of each object of the weather element is displayed as moving from top to bottom along an upright direction in a plane where the screen of the terminal device is located when the terminal device is laid sideways.

Optionally, the orientation information of the terminal device further includes horizontally upward and horizontally downward of the screen of the terminal device. And determining, according to the orientation information of the terminal device, that the motion trajectory of each object of the weather element is displayed as moving from the initial position along the gravitation direction includes: determining that the motion trajectory of each object of the weather element is displayed as falling down from outside of the screen to inside of the screen along a direction vertical to a plane where the screen is located when the screen is faced horizontally upward; determining that the motion trajectory of each object of the weather element is displayed as falling down from inside of the screen to outside of the screen along a direction vertical to a plane where the screen is located when the screen is faced horizontally downward. Optionally, the weather information further includes wind force information and wind direction information. And determining an initial position and a motion trajectory of each object of the weather element according to the orientation information of the terminal device includes calculating a position of each object of the weather element in each frame of animation according to the type of the weather element, the size of each object, the wind force information, the wind direction information, and the orientation information of the terminal device.

Optionally, generating a weather animation according to the weather information and the orientation information of the terminal device includes using a image captured by a camera of the terminal device as a background of the weather animation, or using a predetermined image as a background of the weather animation.

Optionally, when the predetermined image is used as the background of the weather animation, the method further includes: acquiring current time; determining background chromaticity value information of the weather animation according to the current time; adjusting a chromaticity value of the background of the weather animation according to the background chromaticity value information.

Optionally, when the predetermined image is used as the background of the weather animation, the method further includes: acquiring a current date; determining a season of the current date; determining a background type of the weather animation according to the season of the current date; and selecting a predetermined image corresponding to the background type as the background of the weather animation.

In the embodiments, the weather animation is generated according to the weather information and the orientation information. In this way, a plurality of weather conditions are comprehensively and dynamically presented via integrated motion pictures, and the weather conditions are displayed more accurately, realistically, and intuitively. In addition, the weather conditions are presented in combination with current orientation information of a terminal device, thus making the presentation of the weather condition effectively interacts with users by considering the state which the users brought upon the terminal device, and creating more diverse effects in the presentation of the weather conditions. This gives a fully immersive experience for the user, and improves user experience.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:
1. A method for displaying weather, comprising:
   acquiring weather information and orientation information of a terminal device;
   generating a weather animation according to the weather information and the orientation information of the terminal device, wherein generating the weather ani- mation according to the weather information and the orientation information of the terminal device comprises:
using a predetermined image as a background of the weather animation;
acquiring a current time;
determining background chromaticity value information of the weather animation according to the current time;
adjusting a chromaticity value of the background of the weather animation according to the background chromaticity value information; and
displaying the weather animation on the terminal device.

2. The method according to claim 1, wherein generating the weather animation according to the weather information and the orientation information of the terminal device comprises:
determining at least one weather element for generating the weather animation according to the weather information;
determining a motion state of each of the at least one weather element according to the orientation information of the terminal device; and
generating the weather animation according to the motion state of the weather element.

3. The method according to claim 2, wherein the weather information comprises weather type and weather grade; and parameters of the weather element comprise type of the weather element, number of objects of each weather element, and size of each object; and
determining the at least one weather element for generating the weather animation according to the weather information comprises:
determining the type of the weather element, the number of objects of each weather element, and the size of each object according to the weather type and the weather grade.

4. The method according to claim 3, wherein the motion state comprises an initial position and a motion trajectory; and
determining the motion state of each of the at least one weather element according to the orientation information of the terminal device comprises:
determining the initial position and the motion trajectory of each object of the weather element according to the orientation information of the terminal device.

5. The method according to claim 4, wherein displaying the weather animation on the terminal device comprises:
displaying each object of the weather element as moving from the initial position along the motion trajectory on the terminal device.

6. The method according to claim 4, wherein determining the initial position and the motion trajectory of each object of the weather element according to the orientation information of the terminal device comprises:
determining, according to the orientation information of the terminal device, that each object of the weather element moves from the initial position along a gravitational direction.

7. The method according to claim 6, wherein the orientation information of the terminal device comprises: horizontal, vertical, and inclined; and
determining, according to the orientation information of the terminal device, that the motion trajectory of each object of the weather element is displayed as moving from the initial position along the gravitational direction comprises:
when the terminal device is laid horizontally, determining that the motion trajectory of each object of the weather element is displayed as: moving along a direction vertical to a plane where a screen of the terminal device is located;
when the terminal device is laid vertically, determining that the motion trajectory of each object of the weather element is displayed as: moving from top to bottom on a plane where the screen of the terminal device is located; and
when the terminal device is laid sideways, determining that the motion trajectory of each object of the weather element is displayed as: moving from top to bottom along an upright direction in a plane where the screen of the terminal device is located.

8. The method according to claim 6, wherein the orientation information of the terminal device further comprises a screen facing horizontally upward and horizontally downward; and
determining, according to the orientation information of the terminal device, that the motion trajectory of each object of the weather element is displayed as moving from the initial position along the gravitational direction comprises:
when the screen is faced horizontally upward, determining that the motion trajectory of each object of the weather element is displayed as falling down from outside of the screen to inside of the screen along a direction vertical to a plane where the screen is located; and
when the screen is faced horizontally downward, determining that the motion trajectory of each object of the weather element is displayed as falling down from inside of the screen to outside of the screen along a direction vertical to a plane where the screen is located.

9. The method according to claim 4, wherein the weather information further comprises wind force information and wind direction information; and
determining the initial position and the motion trajectory of each object of the weather element according to the orientation information of the terminal device comprises:
calculating a position of each object of the weather element in each frame of the animation according to the type of the weather element, the size of each object, the wind force information, the wind direction information, and the orientation information of the terminal device.

10. The method according to claim 1, wherein when the predetermined image is used as the background of the weather animation, the method further comprises:
acquiring a current date;
determining a season of the current date;
determining a background type of the weather animation according to the season of the current date; and
selecting a predetermined image corresponding to the background type as the background of the weather animation.

11. A device for displaying weather, comprising:
one or more processors; and
a memory configured to store instructions executable by the processor,
wherein the processors are configured to perform:
acquiring weather information and orientation information of a terminal device;
generating a weather animation according to the weather information and the orientation information of the terminal device, wherein generating the weather animation according to the weather information and the orientation information of the terminal device comprises:
using a predetermined image as a background of the weather animation;
acquiring a current time;
determining background chromaticity value information of the weather animation according to the current time;
adjusting a chromaticity value of the background of the weather animation according to the background chromaticity value information; and
displaying the weather animation on the terminal device.

12. The device according to claim 11, wherein generating the weather animation according to the weather information and the orientation information of the terminal device comprises:
determining at least one weather element for generating the weather animation according to the weather information;
determining a motion state of each of the at least one weather element according to the orientation information of the terminal device; and
generating the weather animation according to the motion state of the weather element.

13. The device according to claim 12, wherein the weather information comprises weather type and weather grade; and parameters of the weather element comprise type of the weather element, number of objects of each weather element, and size of each object; and
determining the at least one weather element for generating the weather animation according to the weather information comprises:
determining the type of the weather element, the number of objects of each weather element, and the size of each object according to the weather type and the weather grade.

14. The device according to claim 13, wherein the motion state comprises an initial position and a motion trajectory; and
determining the motion state of each of the at least one weather element according to the orientation information of the terminal device comprises:
determining the initial position and the motion trajectory of each object of the weather element according to the orientation information of the terminal device.

15. The device according to claim 14, wherein displaying the weather animation on the terminal device comprises:
displaying each object of the weather element as moving from the initial position along the motion trajectory on the terminal device.

16. The device according to claim 14, wherein determining the initial position and the motion trajectory of each object of the weather element according to the orientation information of the terminal device comprises:
determining, according to the orientation information of the terminal device, that each object of the weather element moves from the initial position along a gravitational direction.

17. The device according to claim 14, wherein the weather information further comprises wind force information and wind direction information; and
determining the initial position and the motion trajectory of each object of the weather element according to the orientation information of the terminal device comprises:
calculating a position of each object of the weather element in each frame of the animation according to the type of the weather element, the size of each object, the wind force information, the wind direction information, and the orientation information of the terminal device.

18. A non-transitory computer-readable storage medium having stored therein instructions that, when executed by one or more processors of a device, cause the device to perform:
acquiring weather information and orientation information of a terminal device;
generating a weather animation according to the weather information and the orientation information of the terminal device, wherein generating the weather animation according to the weather information and the orientation information of the terminal device comprises:
using a predetermined image as a background of the weather animation;
acquiring a current time;
determining background chromaticity value information of the weather animation according to the current time;
adjusting a chromaticity value of the background of the weather animation according to the background chromaticity value information; and
displaying the weather animation on the terminal device.

* * * * *